United States Patent
Wendling et al.

(10) Patent No.: US 9,294,788 B2
(45) Date of Patent: Mar. 22, 2016

(54) METHOD, CRYPTOGRAPHIC SYSTEM AND SECURITY MODULE FOR DESCRAMBLING CONTENT PACKETS OF A DIGITAL TRANSPORT STREAM

(71) Applicant: NAGRAVISION S.A., Cheseaux-sur-Lausanne (CH)

(72) Inventors: Bertrand Wendling, Divonne-les-Baines (FR); Corinne Le Buhan, Les Paccots (CH)

(73) Assignee: NAGRAVISION S.A., Cheseaux-sur-Lausanne (CH)

(*) Notice: Subject to any disclaimer, the term of this patent is extended or adjusted under 35 U.S.C. 154(b) by 0 days.

(21) Appl. No.: 14/358,838

(22) PCT Filed: Nov. 20, 2012

(86) PCT No.: PCT/EP2012/073064
§ 371 (c)(1),
(2) Date: May 16, 2014

(87) PCT Pub. No.: WO2013/076057
PCT Pub. Date: May 30, 2013

(65) Prior Publication Data
US 2014/0351848 A1 Nov. 27, 2014

Related U.S. Application Data

(60) Provisional application No. 61/562,462, filed on Nov. 22, 2011.

(30) Foreign Application Priority Data

Nov. 22, 2011 (EP) .................................. 11190121

(51) Int. Cl.
*H04N 7/167* (2011.01)
*H04N 21/2347* (2011.01)
(Continued)

(52) U.S. Cl.
CPC ....... *H04N 21/2347* (2013.01); *H04N 21/2541* (2013.01); *H04N 21/26606* (2013.01); *H04N21/4181* (2013.01); *H04N 21/42623* (2013.01); *H04N 21/4353* (2013.01); *H04N 21/4405* (2013.01); *H04N 21/4623* (2013.01)

(58) Field of Classification Search
CPC ............ H04N 21/418; H04N 21/4623; H04N 21/4405; H04N 21/435; H04N 21/426
USPC .............................................. 380/239; 725/31
See application file for complete search history.

(56) References Cited

U.S. PATENT DOCUMENTS 4,866,707 A * 9/1989 Marshall et al. .............. 714/749
7,233,948 B1 * 6/2007 Shamoon et al.

FOREIGN PATENT DOCUMENTS

| EP | 0 281 223 | 9/1988 |
| JP | 2007-158967 | 6/2007 |
| WO | WO 99/48296 | 9/1999 |

OTHER PUBLICATIONS

International Search Report issued in International Application No. PCT/EP2012/073064, dated Jan. 25, 2013.

(Continued)

*Primary Examiner* — Baotran N To
(74) *Attorney, Agent, or Firm* — DLA Piper LLP (US)

(57) ABSTRACT

A method and cryptographic system for descrambling content packets, included within a digital transport stream, having conditional access messages and header data. The method and system require a deciphering algorithm, processed by a descrambler of a multimedia unit, using an initialization vector as a first input and a control word as a second input. The multimedia unit is connectable to a security module for processing the conditional access messages and extracting control words therefrom. The initialization vector, or intermediate data to determine the initialization vector, is the result of a cryptographic function based on at least one variable extracted from the digital transport stream and processed by the security module.

15 Claims, 2 Drawing Sheets

(51) Int. Cl.
*H04N 21/266* (2011.01)
*H04N 21/254* (2011.01)
*H04N 21/418* (2011.01)
*H04N 21/426* (2011.01)
*H04N 21/435* (2011.01)
*H04N 21/4405* (2011.01)
*H04N 21/4623* (2011.01)

(56) References Cited

OTHER PUBLICATIONS

Written Opinion issued in International Application No. PCT/EP2012/073064, dated Jan. 25, 2013.
English language abstract and translation of JP 2007-158967 published Jun. 21, 2007.

* cited by examiner

METHOD, CRYPTOGRAPHIC SYSTEM AND SECURITY MODULE FOR DESCRAMBLING CONTENT PACKETS OF A DIGITAL TRANSPORT STREAM

CROSS-REFERENCE TO RELATED APPLICATIONS

This application is a National Stage of International Application No PCT/EP2012/073064, which claims priority to U.S. Provisional Patent Application No. 61/562,462 filed Nov. 22, 2011 and European Application No. 11190121.1 filed Nov. 22, 2011.

TECHNICAL FIELD

The present invention relates to reception of multimedia data such as encrypted TV events for Pay-TV systems. More particularly, the invention relates to a method, a cryptographic system and a security module for descrambling a digital transport stream received from a broadcaster through a satellite, terrestrial, handheld, IP or cable network. This method is intended to be implemented by a multimedia unit such as a set-top-box or a multimedia mobile device.

BACKGROUND

A digital transport stream typically comprises scrambled audio/video/data content packets and scrambled conditional access messages (ECM, EMM) which have to be processed in order to extract control data (CW); the latter being necessary for the multimedia unit to descramble the content packets relating to the event (e.g. a broadcasted program or a set of programs). Conditional access messages include two kinds of information, namely Entitlement Control Messages (ECM) and Entitlement Management Messages (EMM). The ECM is information relating to content packets, whereas the EMM is information dedicated to an individual end user (subscriber) or a group of end users. The ECM contains the access conditions for the current broadcast event together with control word (CW) for unscrambling this event. The Control Word (CW) is a key used for decrypting content packets of a packetized event broadcasted within the data stream. Thus, each ECM is specific to each event (e.g. a TV program). The EMM is a message used by a security module to set, reset or change product access entitlements, credit, etc. . . . . Thus EMM refers to the rights (access data) of the subscriber for accessing to the content (events). Each content packet comprises payload data (i.e. data of the event such as a movie for instance) and header data. Payload data are encrypted data whereas header data are clear readable data comprising information about its content packet (e.g. an identifier).

Multimedia units such as set-top-boxes (STB) suitable for receiving pay-TV contents are each provided or connected with a security module for processing selective access to broadcast services on a per-subscriber basis managed by a conditional access system (CAS). Such a security module typically refers to a smart card (chip card) which generally can be inserted into a slot of a conditional access reader which, in this case, is a card reader. This reader can be connected to the multimedia unit or be lodged directly within this unit.

All the security operations are generally executed in the security module associated with the multimedia unit or the receiver. Such a security module can be realized in particular according to four distinct forms.

One of the forms is a microprocessor card, a smart card, or more generally an electronic module (having the form of a key, of a tag, etc. . . . ). Such a module is generally of a removable from and connectable to the receiver. The form with electric contacts is the most used, but does not exclude a link without contact, for instance of the type ISO 14443.

A second known design is that of an integrated circuit chip placed, generally in a definitive and irremovable way, in the printed board of the receiver. An alternative is constituted by a circuit mounted on a base or connector, such as a connector of a SIM module.

In a third design, the security module is integrated into an integrated circuit chip also having another function, for instance in a descrambling module of the decoder or the microprocessor of the decoder.

In a fourth embodiment, the security module is not realized in a hardware form, but its function is implemented in a software form only. This software can be obfuscated within the main software of the receiver.

Given that in the four cases the function is identical, although the security level differs, we will refer to the security module in whichever way appropriate to realize its function or the form that can take this module. In the four designs described above, the security module has the means for executing a program (CPU) stored in its memory. This program allows the execution of the security operations, verifying the rights, effecting a decryption or activating a decryption module etc.

This security module is required for decrypting the scrambled content packets of the digital transport stream. To this end, the conditional access messages contained in the transport stream are routed to the security module which posses the keys to decrypt the ECM in order to extract the control word (CW) which then will be used by a descrambler (within the multimedia unit) for descrambling the content packets. This process is achieved only if the conditional access rights (provided by the EMM) are valid and checked by the security module.

Content packets, more particularly the payload data of these content packets, can be scrambled by using a Cipher Block Chaining (CBC) encryption mode in which an Initialization Vector (IV) is used as supplementary input, in addition to the encryption key. Therefore, the IV can be seen as a parameter used for altering the encryption key. Typically, this IV is a numerical value used in combination with the base encryption key before the first step of the encrypting content process. Initialization vectors are often used to prevent a sequence of data that is identical to a previous sequence from producing the same result when encrypted. Thus, the use of IV is fully suitable for encrypting data such as content packets resulting from packetized events or programs to be broadcast.

Contrary to the encryption key, the IV does not need to remain secret. Thus, an IV can be simply extracted from a digital transport stream, and then directly used for descrambling content packets of that stream. However, one of the drawbacks resulting from this way of doing is that there is no possibility to control the use of the IV which is open-access within the broadcasted transport stream. According to another known embodiment, the IV can be supplied by the deciphering algorithm itself, where it is generated or can be extracted thereof, sometimes under an encrypted form. One of the drawbacks of this embodiment is that generating of the IV cannot be modified without replacing the deciphering algorithm installed within all the multimedia units.

Document EP 281 223 relates to secure messaging systems and in particular to message errors within communication networks in which a considerable number of personal computers are interconnected. As such systems often use insecure communication media, such as public phone systems, interception and removal of messages, modification of messages and insertion of false messages can be easily performed. To overcome this problem this document suggests storing a history of messages and it suggests including this history in any new message. This document relates to technology background only.

Document EP 1 062 812 discloses a method and apparatus for protection of streamed media content. In particular, it refers to a streaming media player (e.g. a set-top-box) processing content packets transport streams to be rendered on a rendering device (e.g. a TV display screen). This apparatus provides content protection and digital rights management. The transport stream comprises several streams in the MPEG-4 format. For creating protected MPEG-4 content files (each of them comprising initial object descriptor and encrypted content), this document discloses a process which uses a CreateBox representing a DigiBox creation utility. A DigiBox contains governance rules, initialization vectors and keys. In order to save encryption/decryption costs, the content packets are not all encrypted but only one-tenth of the content packets are encrypted. The apparatus can include a Content Management and Protection System (CMPS) for governing the use of controlled content, including decrypting the content and ensuring that the content is only used as permitted associated rules. The user might obtain a CMPS on a smart card to plug into the media player. The CMPS receives the MPEG-4 encrypted content from a demultiplexer, decrypts it and, if the rules are satisfied, sends it to appropriate devices (scene descriptor Graph, AVO Decoder and Object Descriptors) in view to be finally sent to the rendering device. However, the CMPS disclosed in this document is used for performing the same operations (i.e. decrypting the content and ensuring that the content is only used as permitted associated rules) as those performed by means of security modules of the prior art. Besides, the initialization vector comes from the digital transport stream, in particular from the DigiBox contained in the stream. Therefore, this document does not disclose other means for increasing the security of the deciphering process.

Accordingly, there exists a need for providing means for descrambling content packets of a digital transport stream which increase the security of deciphering processes and help to prevent piracy of broadcast contents in a context of a Pay-TV or any other paid service.

SUMMARY OF THE INVENTION

In order to solve the above-mentioned problems, the present invention aims to suggest a new method for descrambling content packets of a digital transport stream, a cryptographic system and a security module for implementing this method.

This aim is reached by a method to descramble content packets, included within a digital transport stream. This transport stream also comprises at least conditional access messages (ECM, EMM) and content packets provided each with a header data. This descrambling method requires a deciphering algorithm processed by a descrambler of a multimedia unit (STB). This deciphering algorithm (e.g. AES) requires an initialization vector (IV) as first input and a control word (CW) as second input. This control word is provided by a security module in response to the processing of a conditional access message (ECM, EMM). To this end, the multimedia unit is connected or provided with this security module, at least for processing said conditional access messages and extracting control words (CW) thereof. According to the present method, the initialization vector (IV), or data to determine this initialization vector, is the result of a cryptographic function which is based on at least one variable (namely data used as input of this function) extracted from the digital transport stream and executed into the security module. In other words, it is determined by the result of a cryptographic function which uses at least one variable which has been processed by the security module after this variable had been derived from one of said conditional access messages or from one of said content packets. It should be noted that the word "variable", assigned to data input in the cryptographic function, arises from the mathematical terminology referring to functions. Thus, said variable refers to input data for this function and should be regarded as being data.

According to an embodiment of the invention, this cryptographic function is parameterized with secret information contained within this security module. This secret information may comprise information arising from at least one value or character string such as an identifier (card ID) or a secret number stored in the security module.

The aim of the invention is also reached by a cryptographic system for descrambling content packets, provided by an incoming digital transport stream including at least header data of the content packets and conditional access messages (ECM, EMM). This system comprising:
an extractor for extracting data from the digital transport stream,
a security module provided with means for processing the aforementioned conditional access messages (ECM, EMM) and extracting control words (CW) thereof,
a descrambler able to run a deciphering algorithm using as inputs both an initialization vector (IV) and at least one control word (CW),
secure transferring means for exchanging data at least between the security module and the descrambler (e.g. in view to read data located within the security module), and
computing means for generating the initialization vector, or data to determine this initialization vector, as a result of a cryptographic function at least based on said data firstly extracted from the digital transport stream, then processed by the processor into the security module.

The aim of the invention is also reached by a security module for implementing the above method and its embodiments, in communication with a multimedia unit used for descrambling content packets by means of a descrambler processing a deciphering algorithm. These content packets are provided by a digital transport stream including at least conditional access messages and content packets provided each with a header containing header data. This security module comprising:
a first interface connectable through a first channel between the security module and the incoming of the stream for inputting at least said conditional access messages with at least one variable provided by data extracted from said digital transport stream,
a second interface connectable through at least one secured channel with the multimedia unit for exchanging information between the security module and the multimedia unit,
a processor for processing at least said variable arising from said digital transport stream, for checking conditional access rights then for decrypting and extracting control words from conditional access messages,
a computing unit to generate an initialization vector, or intermediate data for determining said initialization vector, by means of a cryptographic function that takes as input at least said variable which has been processed by the processor.

BRIEF DESCRIPTION OF THE DRAWINGS

The present invention will be better understood thanks to the attached figures in which.

DETAILED DESCRIPTION

Figure 1:
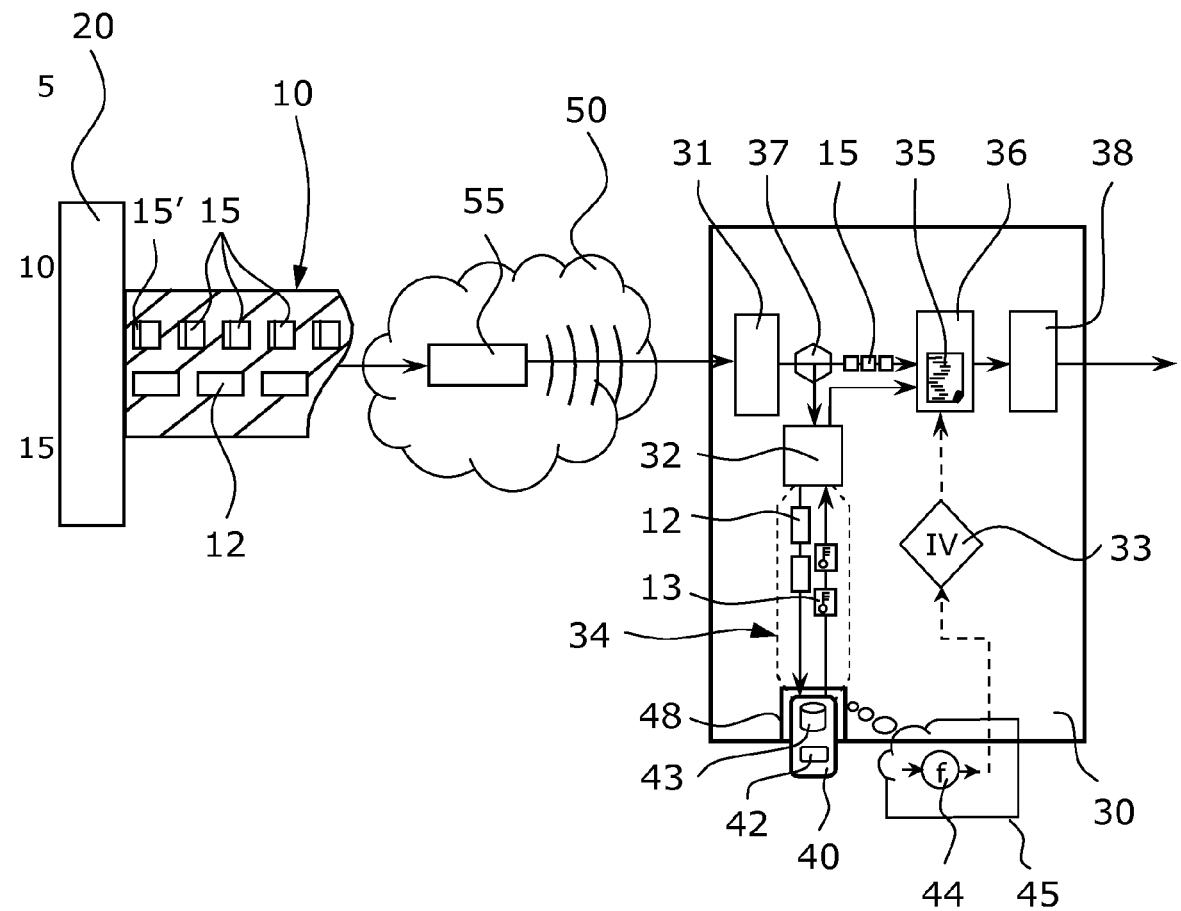
FIG. 1 shows a schematic overview of means involved in the present invention.

Referring to FIG. 1, it schematically illustrates a digital transport stream 10 of multimedia data (mainly audio/video data) broadcasted by at least one broadcaster 20 (also denoted as being a head-end). This transport stream 10 is designated to be received by a multimedia unit 30, such as a set-top-box or a handheld device (e.g. a mobile phone) in view to be finally played/displayed on an appropriate means such as a TV or a handheld display and/or audio means (not shown) connected to this multimedia unit 30. To receive data contained in the transport stream 10, the multimedia unit 30 is connectable to at least one network 50, for instance a satellite network (DVB-S), a terrestrial network (DVB-T), a cable network (DVB-C), an Internet network (DVB-IP) or a handheld network (DVB-H). The designation DVB-H refers to the Digital Video Broadcasting Standard for handheld devices, in particular to mobile broadband Internet access for cellular phones including mobile TV receivers. Each network is implemented by a modulator 55. This modulator is used for converting the incoming transport stream 10 into a modulated stream suitable for its transport towards the receivers. Data received by this means may come either by one transport stream or by transport streams from one or several head-ends.

Within the context of a Pay-TV or any other paid service such as Video On Demand (VOD), the transport stream 10 is broadcasted in a scrambled form, so that only authorized end users (i.e. subscribers) are allowed to descrambled this stream with their multimedia unit for retrieving its original content (audio/video/data events). The scrambled transport stream 10 comprises a plurality of audio/video/data content packets 15 together with conditional access messages 12. A transport stream generally comprises several events, typically a plurality of TV programs of different channels. Each content packet 15 comprises payload data (audio/video/data) attached to a specific header including header data 15'. The encrypted portion of the content packet refers to payload data, whereas header data 15' remain in a non-encrypted form. Each conditional access message 12 may comprise either an ECM (Entitlement Control Message) or an EMM (Entitlement Management Message) as already disclosed in the preamble of the present specification.

According to FIG. 1, the multimedia unit 30 includes a demultiplexer 31 for reconverting the incoming transport stream 10 which was previously multiplexed by the broadcaster 20 in accordance to a common process. The content packets 15 of the transport stream are directed towards the descrambler 36 of the multimedia unit, whereas the conditional access messages 12 (ECM, EMM) are directed towards a Conditional Access Kernel 32 (CAK), then towards the security module 40 through a secured channel 34. The CAK generally relates to software used as interface by the security module. This CAK 32 and the secured channel 34 are the constituents of transferring elements (transferring means) for exchanging information between the security module 40 and the descrambler 36.

As shown in FIG. 1, the multimedia unit 30 is provided with a security module 40 (typically a removable smart card/chip card) which can be inserted into a conditional access reader 48 (in particular a card reader) lodged within the multimedia unit or in the vicinity of this unit. Alternatively, the security module could be located away from the multimedia unit 30, for instance within a server connected to the multimedia unit by means of an IP-connection provided with a secured return path. The security module 40 is in charge of at least processing the access conditional message 12 by using a processor 42 or any other suitable means. These messages 12 allow on the one hand to check the rights of the subscriber by processing the EMM, and on the other hand to descramble the content packets 15 after extracting the control word(s) 13 from the ECM.

The descrambling method of the present invention requires a deciphering algorithm 35 processed by a descrambler 36 within the multimedia unit 30. As better shown in FIG. 2, this deciphering algorithm 35 uses an initialization vector 33 as a first input and a control word 13 as second input. The scrambled content (namely the content packets 15 or at least the payload of these packets) can be regarded as being the third input of the deciphering algorithm. Each control word 13 is extracted by the security module 40 from the condition access messages 12. The deciphering algorithm 35 can be a symmetric-key algorithm such as AES (Advanced Encryption Standard) or any other CBC algorithm or even another type of algorithm which would be convenient for the deciphering process.

According to the present invention, the initialization vector 33 is the result of a cryptographic function 44 based on at least one variable 43 which had been extracted from the digital transport stream 10 and which has been processed in the security module 40, for instance by the processor 42 or any other processing unit. In variant, this variable 43 can be derived from data extracted from the digital transport stream 10. Alternatively, this cryptographic function 44 can also provide intermediate data 33' used to determine this initialization vector. Therefore and according to the present invention, the initialization vector 33, or said intermediate data 33', is determined by performing the following steps:

extracting at least one variable 43 from the digital transport stream 10, in particular from one of the conditional access messages 12 or from one of the content packets 15 (especially from header data 15' of a content packet), processing said variable 43 in the security module 40 in view to send it to a cryptographic function 44, inputting this variable 43 into said cryptographic function 44 and defining said initialization vector 33, or said intermediate data 33', as being the result of said cryptographic function 44.

Instead of the first above-mentioned step, one may also suggest:

determining at least one variable 43 derived from data comprised in the digital transport stream 10, in particular from one of the conditional access messages 12 or from one of the content packets 15 (especially from header data 15' of a content packet).

Accordingly, the calculation of the IV 33 depends on data which are stored or have to be processed by the security module. This means that the security module 40 is required for determining the IV. If the security module is not readable by the conditional access reader 48, then no IV can be computed and the control words (acting as keys) will be insufficient for performing the descrambling process of the content packets. Then, to descramble the content packets 15 (especially the scrambled payload data of these packets) the deciphering algorithm of the descrambler needs two different things, namely the correct initialization vector 33 and the descrambling key (CW 13).

Advantageously, these requirements allow raising the security level required for playing/displaying events broadcasted by means of a digital transport stream by providing a supplementary difficulty to malicious people seeking to hack paid services. Another advantage of the present invention is that the descrambling process may change and even evolve according to updating the security module. Contrary to an IV determination resulting from a static process, which is e.g. permanently stored in the multimedia unit, the IV computation according to the present invention can be regarded as resulting from a dynamic process since it is easily upgradeable and depends on a removable and exchangeable support, such as a smart card. The parameter(s) or data used as input of the cryptographic function 44, or this cryptographic function itself, can be advantageously changed at any time, e.g. by means of conditional access messages 12, and especially without any dependence on the multimedia unit.

According to the invention, the IV computation is preferably made continuously, so the IV may change very often. For instance, a new IV can be determined at each time a new ECM is received. Typically, one control word allows 10 seconds of a Pay-TV event to be decrypted. After this time duration, called a cryptoperiod, the control word is changed for security reasons. Alternatively, it is also possible to generate many different IV during one cryptoperiod, given that these IV can be determined on the basis of other parameters which do not arise from the ECM (e.g. content parameters) during one cryptoperiod. These IV can be generated at regular or irregular intervals.

As shown in FIG. 1, once the descrambling process performed by the deciphering algorithm 35 is done, the decrypted content packets are processed generally by an MPEG decoder 38 in order to obtain a decompressed output signal which is playable or displayable on an appropriate means (e.g. a TV screen or audio device) for the end user.

Figure 2:
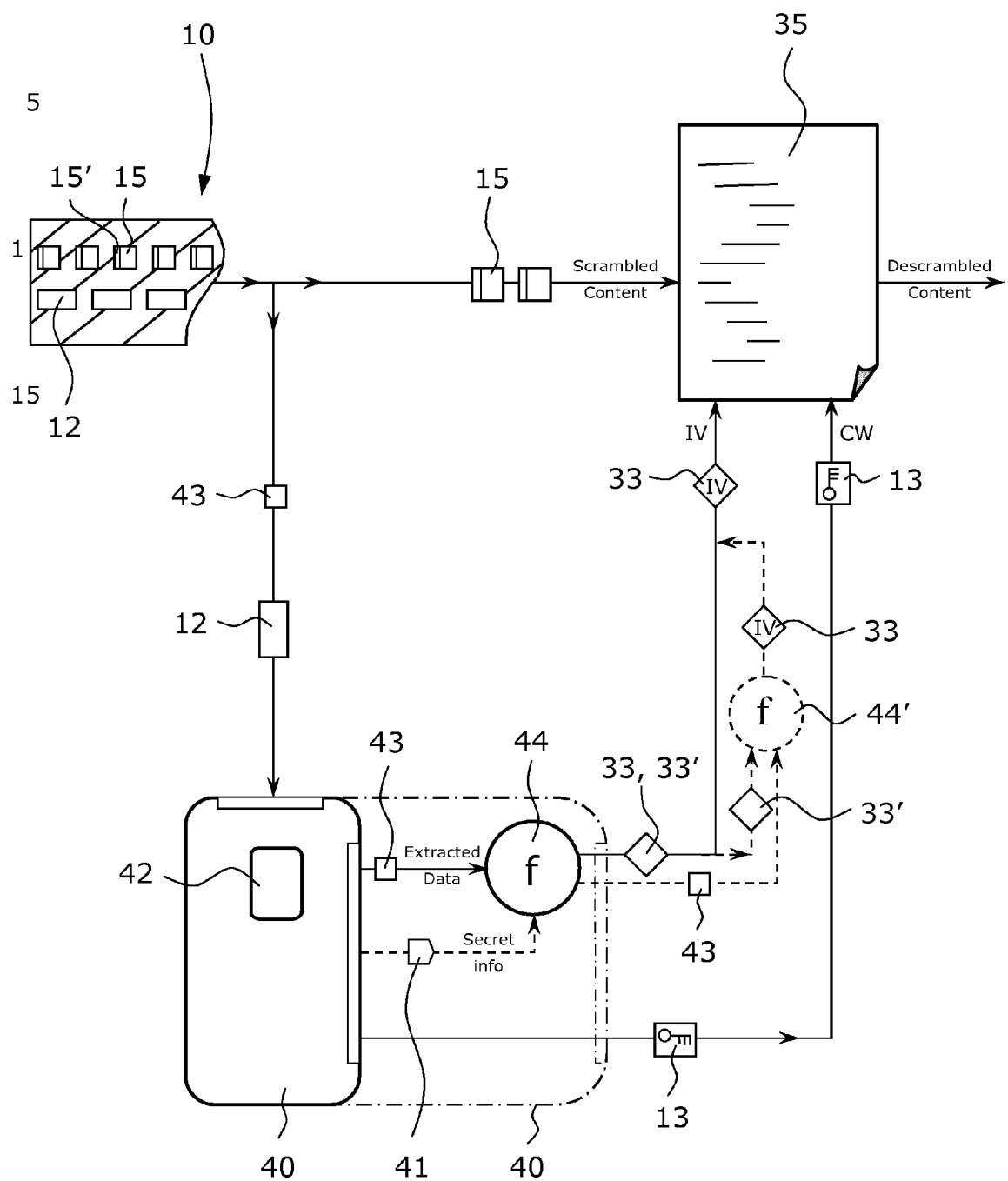
FIG. 2 shows several flows of data for producing a descrambled content from the digital transport stream in accordance with the present invention.

According to one embodiment shown in FIG. 2, the cryptographic function 44 is parameterized with secret information 41 contained within the security module. This secret information 41 may comprise information arising from at least one value or character string of any type, for instance a secret identification number (card ID) such as a code (numeric or alphanumeric expression) or any secret number stored in the security module. This secret information can be permanently or temporarily stored in a (secured) memory of this security module and can be advantageously used as input parameter(s) for the cryptographic function.

According to another embodiment also shown in FIG. 2, the variable 43 determined from the digital transport stream 10 refers to data extracted or derived from a condition access message 12, for instance from an ECM or an EMM.

Alternatively, data 43 is extracted from a content packet 15 of the digital transport stream, in particular from the header data 15' of this content packet. The variable 43 may comprise data referring to a timing system (clock) or data used for identifying the content packets or other data (such as specific bits) reserved for the determination of the IV.

According to one embodiment of the invention shown by a continuous line in FIG. 2, the cryptographic function 44 produces directly the initialization vector 33 as output of this function.

Alternatively and as shown by a dash line in this figure, the cryptographic function 44 provides intermediate data 33' which are then further processed within the multimedia unit 30, in particular by means of a second function 44' processed within a computing means 45 such as a processor or any other computing unit, in order to determine the initialization vector 33. Alternatively, these intermediate data 33' are processed, by the second function 44', together with the variable 43 extracted from the digital transport stream 10. As a result, the IV 33 can be determined by the combination of the intermediate data 33' and the variable 43, for instance by using an XOR function or any other mathematical function as second function 44' for processing these two inputs 33', 43. This second function 44' can be implemented by any processor. The variable 43 used as one input of the second function 44' can be passed through the cryptographic function 44 with or without any transformation.

Preferably, the computing means 45 comprises at least one processor located either within the multimedia unit 30 or within the security module 40. Therefore, the cryptographic function 44 can be implemented either into the multimedia unit or into the security module 40. This latter case is represented by the mixed line in FIG. 2. Thus, the cryptographic function 44 can be a mathematical function stored into a secured memory either of the security module or of the multimedia unit. If this cryptographic function is stored within the security module and is configured e.g. for providing a value or a character string as IV, then the initialization vector becomes directly readable from the processor of the security module or from the memory of this module.

In accordance with a further embodiment, at least a part of the secret information 41 stored within the security module refers to variable data and/or updateable data.

Whatever the embodiment of the invention, the initialization vector 33 is transmitted from the computing means 45 towards the descrambler 36 in a secured manner, i.e. by using secure transmission means or elements. For instance, secure transmission elements may comprise a secured channel (such as the secured channel 34 shown in FIG. 1 or any other similar channel) and/or encryption means, e.g. at least one transmission key and suitable encryption/decryption elements for transmitting the IV under an encrypted form. The same applies for the control word 13.

To implement the method of the present invention, the present invention also refers to a cryptographic system for descrambling content packets 15, provided by at least one digital transport stream 10 including at least header data 15' belonging to content packets 15 and conditional access messages 12 (ECM, EMM). This system comprises an extractor 37 (FIG. 1), or any means for extracting (or reading or copying) the variable 43 from the digital transport stream 10, and a security module 40 provided with a processor unit 42. This processor 42 is used for processing the conditional access messages 12, in particular for checking conditional access rights (of the subscriber) from the EMM then decrypting and extracting control words 13 from ECM if the access rights are valid. Other tasks could be also performed by the processor unit 42. To input at least conditional access messages 12 and the variable 43 from the digital transport stream 10 towards the security module 40, the latter comprises a first interface connectable through a first channel. The system also comprises a descrambler 36 for running a deciphering algorithm 35. This deciphering algorithm requires an initialization vector 33 as a first input and at least one control word 13 as second input of this algorithm (FIG. 2). The system of the invention also comprises secure transferring means, such as one or several secure channels and/or transmission key(s), for exchanging information through a second interface (of the security module) at least between said security module 40 and said descrambler 36. As shown in FIG. 1, these transferring means are the conditional access kernel 32 and the secured channel 34 in order to securely connect this kernel 32 to the security module 40. Between the conditional access kernel 32 and the descrambler 36, the information (e.g. the control word 13) are encrypted and thus securely transferred by means of a transmission key system.

According to the invention, this system comprises computing means, such as a computing unit 45, for generating the initialization vector 33 arising from a cryptographic function 44 which is implemented within the computing unit 45. This cryptographic function 44 requires at least data 43 which are firstly extracted from the digital transport stream 10 and secondly processed by the processor 42 into the security module 40. Alternatively, the computing unit 45 can be used for generating intermediate data 33' which can be then used for determining the initialization vector 33. These intermediate data 33' also result from the cryptographic function 44.

Depending on the location of computing unit 45 used for processing the cryptographic function 44, another secure channel can be set up to transfer other data, such as the IV 33 or intermediate data 33' to determine the IV, between the computing unit 45 and the descrambler 36 and between the security module 40 (in particular its processor 42) and the computing unit 45, in particular if this unit 45 is distinct from the processor 42 and is located e.g. into the multimedia unit 30 (i.e. not into the security module).

Preferably, the computing means 45 is comprised within the security module 40. The computing means 45 and the processor 42 can be either two distinct elements or can be assembled in order to form one computing entity. Alternatively, the computing means 45 may be part of the multimedia unit 30.

The security module can be a smart card (i.e. a removable chip card) provided with a memory for storing data 43, and provided with the processor 42 to at least extract the control word 13 from a part of the condition access messages 12. The cryptographic function 44, the second function 44', data 43 and the deciphering algorithm 35 do not differ from those disclosed previously with reference to the method of the present invention.

The present invention also refers to a security module 40 for implementing the method disclosed above. As already disclosed in reference of this method, the security module 40 is in communication with a multimedia unit 30 used for descrambling content packets 15 by means of a descrambler 36 processing a deciphering algorithm 35. These content packets 15 being provided by a digital transport 10 including at least header data 15' of the content packets 15 and conditional access messages 12, comprising a first interface connectable through a first channel between the security module 40 and the incoming of the stream 10 for inputting at least said conditional access messages 12 and said variable 43 from said digital transport stream 10. This security module also comprises a second interface connectable through at least one secured channel 34 with the multimedia unit 30 for exchanging information between the security module 40 and the multimedia unit 30. The security module 40 also comprises a processor 42 for processing at least one variable 43 extracted from the digital transport stream 10, for checking condition rights (from EMM) and then for decrypting and extracting control word 13 from conditional access messages 12 (ECM). This security module further comprises a second processing means, such as the computing unit 45, to generate an initialization vector 33, or intermediate data 33' for determining said initialization vector, by means of a cryptographic function 44 taking as input at least said variable 43 processed by the processor 42.

Thus, the security module 40 of the present invention comprises on the one hand a first processor 42 for processing the variable 43 extracted from the digital transport stream, and on the other hand a second processing means, namely the computing unit 45, for generating an initialization vector 33, or intermediate data 33', on the basis of the data 43 (extracted from the digital transport stream 10) provided at the output of the first processor 42, with or without transformation. The first processor 42 is used to extract the variable 43, to check conditional access rights contained into the EMM, then decrypting and extracting the control word 13 from the conditional access message 12 (ECM), whereas the computing unit 45 is used for generating the required initialization vector 33, or at least said intermediate data 33', by means of the cryptographic function 44 using as input at least a part of the output data of the first processor 42. By this means, the security module 40 of the present invention is able to provide the two required inputs (i.e. the CW and the IV or data to determine this IV) for decrypting the scrambled content within the descrambler 36.

According to another embodiment, the security module 40 further comprises a memory for storing secret information used to parameterize the cryptographic function 44. Among the data usable as parameters of this function 44, one can mention an identifier (card ID) or a secret number, keys (e.g. decrypting keys), clock data or any other data stored in the security module.

According to another embodiment, the variable 43 extracted from the digital transport stream 10 refers to data extracted from a conditional access message 12 (ECM, EMM) or refers to data extracted from the header data 15' of the content packets 15.

Although the embodiments of the subject-matters of the present invention mainly refer to one variable 43, it should be noted that several variables 43 could be also extracted from any conditional access message 12 and/or from any content packets 15 (in particular from any header data 15') instead of one single variable 43.

The invention claimed is:

1. A method to descramble content packets provided within a digital transport steam and being processed within a multimedia unit, the multimedia unit comprising a descrambler for implementing a deciphering algorithm using an initialization vector as a first input and a control word as a second input, said content packets being provided with header data, said digital transport stream further comprising conditional access messages, said control word being provided by a security module in response to the processing of at least one of said conditional access messages, said method comprising:

using a first microprocessor of the security module to extract or derive, from the digital transport stream, at least one variable processed by said security module; and generating the initialization vector, or intermediate data for determining said initialization vector, by inputting said variable into a cryptographic function implemented by the first microprocessor or a second microprocessor.

2. The method of claim 1, wherein said cryptographic function is parameterized with secret information contained within the security module.

3. The method of claim 1, wherein said variable extracted from the digital transport stream refers to data extracted from a conditional access message.

4. The method of claim 1, wherein said variable extracted from the digital transport stream refers to data extracted from the header data of the content packets.

5. The method of claim 1, wherein said cryptographic function produces said initialization vector.

6. The method of claim 1, wherein said cryptographic function produces intermediate data to determine the initialization vector, said intermediate data being further processed within the multimedia unit to determine the initialization vector.

7. The method of claim 1, wherein said cryptographic function produces intermediate data to determine the initialization vector, said intermediate data being further processed within the multimedia unit together with said variable extracted from the digital transport stream to determine the initialization vector.

8. The method of claim 2, wherein the secret information refers to updateable data.

9. A Cryptographic system for descrambling content packets, with at least header data, included in a digital transport stream, with conditional access messages, said system comprising:
- a multimedia unit adapted to extract at least one variable from the digital transport stream;
- a security module provided with a microprocessor for processing said conditional access messages and extracting control words therefrom;
- said multimedia unit being further adapted to run a deciphering algorithm using an initialization vector as a first input and the control word as a second input and exchange information at least between said security module and said multimedia unit; and
- a computing unit for generating the initialization vector, or intermediate data to determine this initialization vector, as a result of a cryptographic function based on at least said variable extracted from the digital transport stream and processed by the microprocessor into the security module.

10. The cryptographic system of claim 9, wherein said computing unit for generating said initialization vector is included within said security module.

11. The cryptographic system of claim 9, wherein said security module is a smart card.

12. A security module adapted to be in communication with a multimedia unit used for descrambling content packets using a descrambler processing a deciphering algorithm, said content packets, having at least header data, and included in a digital transport stream with conditional access messages, said security module comprising:
- a first hardware interface connectable through a first channel between the security module and the incoming stream for inputting at least said conditional access messages with at least one variable provided by data extracted from said digital transport stream and a second hardware interface connectable through at least one secured channel with the multimedia unit for exchanging information between the security module and the multimedia unit;
- a first microprocessor adapted to process a variable from said digital transport stream, check conditional access rights and decrypt and extract control words from conditional access messages; and
- a second microprocessor adapted to generate an initialization vector, or intermediate data for determining said initialization vector, using a cryptographic function that inputs at least said variable processed by the first microprocessor.

13. The security module of claim 12, further comprising a memory for storing secret information used to parameterize the cryptographic function.

14. The security module of claim 12, wherein said variable extracted from the digital transport stream refers to data extracted from a conditional access message.

15. The security module of claim 12, wherein said variable extracted from the digital transport stream refers to data extracted from the header data of the content packets.

* * * * *